Figure 1:
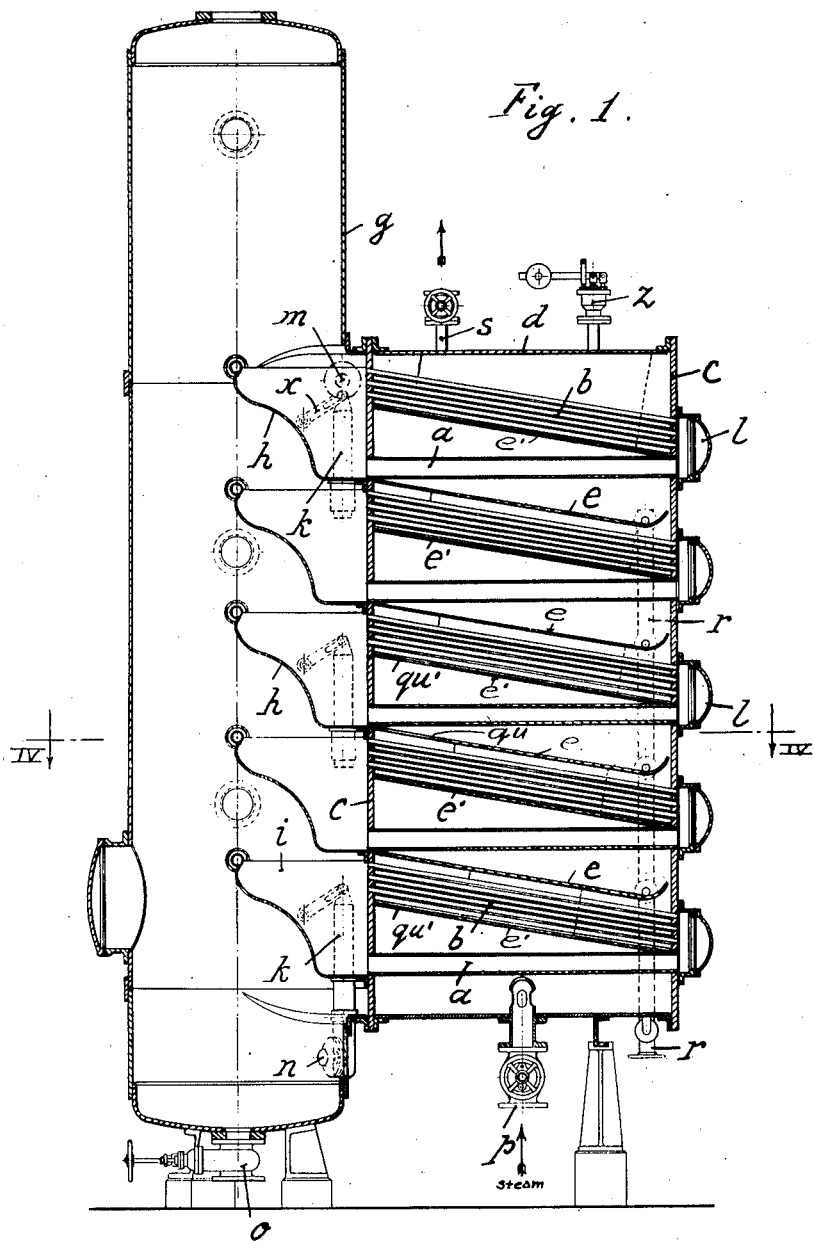

Aug. 2, 1927.

W. VOGELBUSCH 1,637,431

CONCENTRATOR FOR LIQUIDS

Filed Aug. 7, 1924    2 Sheets-Sheet 1

Witnesses:

Inventor:
Wilhelm Vogelbusch

Aug. 2, 1927.  1,637,431
W. VOGELBUSCH
CONCENTRATOR FOR LIQUIDS
Filed Aug. 7, 1924   2 Sheets-Sheet 2
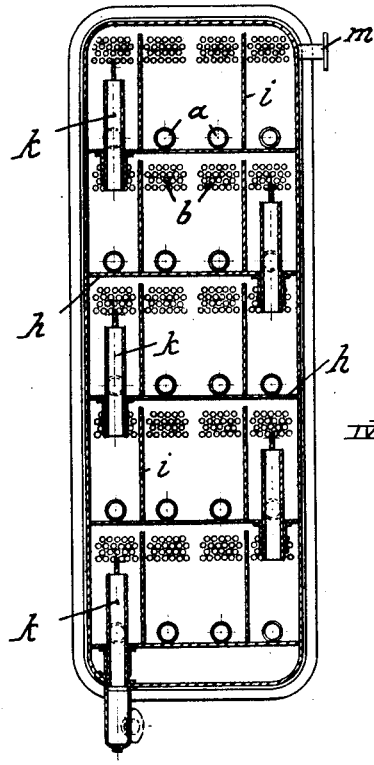
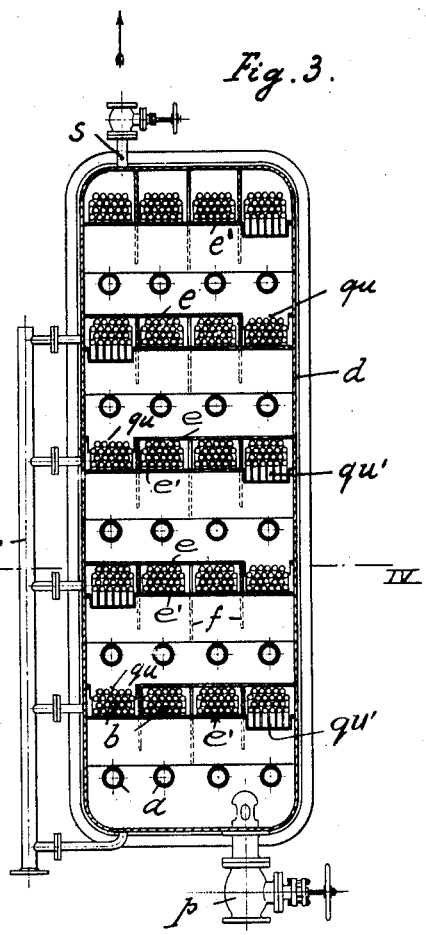
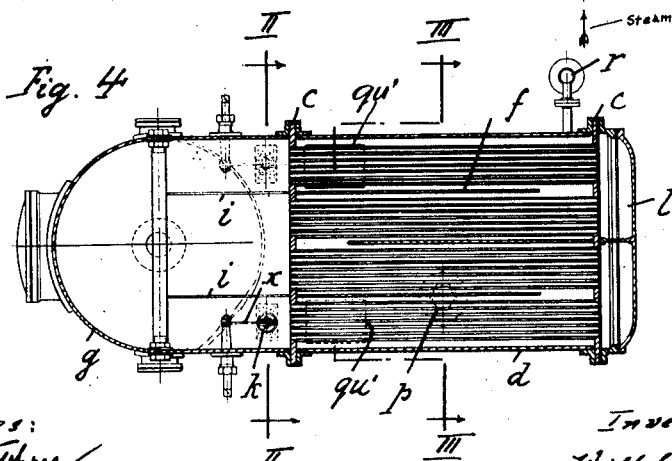

Patented Aug. 2, 1927.

1,637,431

UNITED STATES PATENT OFFICE.

WILHELM VOGELBUSCH, OF VIENNA, AUSTRIA.

CONCENTRATOR FOR LIQUIDS.

Application filed August 7, 1924, Serial No. 730,671, and in Germany November 22, 1923.

This invention relates to an improvement in concentrators for liquids of the type in which the liquid to be concentrated is passed over a suitable number of superposed bottoms and heated in heating elements lying laterally of the liquid container proper or vaporizing chamber and is thus concentrated by an uninterrupted working. The novelty consists in forming the heating surface of each heating element by one lower row of wide heating tubes that are horizontally located and a plurality of rows of comparatively narrow heating tubes which are upwardly inclined toward the vaporizing chamber and in communication with and above said wide heating tubes, whereby the efficiency of said concentrator is considerably increased.

The accompanying drawings show the improved concentrator by way of example in a preferred form of its construction: Fig. 1 is a side view thereof, partly in section, while Figs. 2 and 3 are vertical sections on the lines II—II and III—III respectively of Fig. 4, which is a horizontal section through the apparatus on lines IV—IV of Figs. 1 and 3, with baffle plate $e$ omitted for sake of clearness.

The improved concentrator has a plurality of, for instance five, superposed heating elements consisting each of one row of wide heating tubes $a$ that are horizontally located and a plurality of rows of comparatively narrow heating tubes $b$ upwardly inclined toward the vaporizing chamber $g$ and in communication with and above said wide heating tubes. Said heating elements are enclosed by a common heating case $d$ having inclined baffles $e$ and $e^1$ respectively above and below the bank of narrow heating tubes and vertical guiding tongues $f$ for a uniform distribution of the heating medium flowing therethrough. The heating chamber for the latter is formed by said case $d$ and tube sheets $c$ for the heating tubes $a$, $b$. Said heating elements are in communication with and arranged laterally of the vaporizing chamber $g$. In each of said heating elements an independent liquid layer is maintained by the cups $h$ in the vaporizing chamber $g$ at one end and by the headers $l$ at the other end thereof. Said cups $h$ are subdivided by partitions $i$ and, by overflow pipes $k$ of adjustable height (as indicated at $x$), one arranged in each cup, in communication with each other in such a way that, after the uppermost liquid compartment is filled with liquid to be concentrated the further supplied liquid flows through the pipe $k$ to the next lower liquid compartment, and so on.

The operation is as follows:—

The heating medium, for instance steam, enters the lower end of the heating chamber at $p$ and flows at high speed upwards along the heating elements while being uniformly distributed by the vertical guiding tongues $f$ and inclined baffles $e$ and $e'$ and passing through apertures $qu$, $qu^1$ in the latter. The condensate formed runs down the inclined baffles and drips from the lower baffle $e^1$ at the free bottom end thereof onto the next upper baffle $e$ underneath having for this purpose an upturned free bottom end, the condensate being hence led to the outside through a common pipe $r$, while the uncondensed heating gases escape from the top of the heating chamber at $s$, where furthermore, if desired, a safety valve $z$ may be provided.

The liquid to be concentrated and continuously supplied at $m$ enters the adjacent compartment of the uppermost subdivided cup $h$ and passes, for its being acted upon and boiled by the heating medium flowing through the heating chamber, in a continuous current first through the wide tubes $a$ in rearward direction and then through the header $l$ and the narrow tubes $b$ in forward direction back to the cup $h$. The liquid further supplied at $m$ causes part of the contents in the cup $h$ to flow through the header $l$ to the adjacent compartment of the subdivided cup, and so on, until it escapes from the last compartment of the cup through the overflow pipe $k$ into the next cup underneath, through which it flows in the same way above-described. The liquid passes thus from the uppermost heating element down to the lowermost one where it escapes at $n$ as a thick juice into the bottom end of the vaporizing chamber $g$ whence it can be let-off through the valve $o$.

What I claim, is:—

In a concentrator for liquids, comprising a plurality of superposed heating elements, a heating chamber enclosing the latter and through which flows a uniformly distributed heating medium in upward direction along said heating elements, and a common vaporizing chamber in communication with and laterally of said heating elements; the combination, in each of said heating elements, of one lower row of wide horizontally located heating tubes and a plurality of rows of narrow heating tubes upwardly inclined toward the vaporizing chamber and in communication with and above said wide heating tubes for a passage of the liquid to be concentrated first through the wide and then through the narrow heating tubes from the uppermost down to the lowermost heating element.

In testimony whereof I have hereunto set my hand.

WILHELM VOGELBUSCH.